United States Patent
Park et al.

(10) Patent No.: US 10,312,561 B2
(45) Date of Patent: Jun. 4, 2019

(54) UNIT CELL PACK

(71) Applicant: LG CHEM, LTD., Seoul (KR)

(72) Inventors: Hyun-Chul Park, Daejeon (KR);
Kyung-Hyun Bae, Daejeon (KR);
Byung-O Kong, Daejeon (KR);
Jin-Kyu Shin, Daejeon (KR);
Hyung-Jin Hwang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 384 days.

(21) Appl. No.: 15/325,316

(22) PCT Filed: Oct. 23, 2015

(86) PCT No.: PCT/KR2015/011278
§ 371 (c)(1),
(2) Date: Jan. 10, 2017

(87) PCT Pub. No.: WO2016/068551
PCT Pub. Date: May 6, 2016

(65) Prior Publication Data
US 2017/0187084 A1    Jun. 29, 2017

(30) Foreign Application Priority Data

Oct. 29, 2014 (KR) .................. 10-2014-0148698
Oct. 30, 2014 (KR) .................. 10-2014-0149417

(51) Int. Cl.
*H01M 10/6566* (2014.01)
*H01M 2/20* (2006.01)
(Continued)

(52) U.S. Cl.
CPC ......... *H01M 10/6566* (2015.04); *H01M 2/10* (2013.01); *H01M 2/1077* (2013.01);
(Continued)

(58) Field of Classification Search
CPC ............. H01M 10/486; H01M 10/613; H01M 10/627; H01M 10/647; H01M 10/6556;
(Continued)

(56) References Cited

U.S. PATENT DOCUMENTS 7,858,229 B2 * 12/2010 Shin ..................... H01M 2/1077
429/179
9,017,836 B2 * 4/2015 Park .................... H01M 2/1077
429/7
(Continued)

FOREIGN PATENT DOCUMENTS

KR    10-2007-0011654 A    1/2007
KR    10-2007-0112490 A    11/2007
(Continued)

OTHER PUBLICATIONS

International Search Report issued in PCT/KR2015/011278 (PCTISA/210), dated Feb. 29, 2016.

*Primary Examiner* — Lingwen R Zeng
(74) *Attorney, Agent, or Firm* — Birch, Stewart, Kolasch & Birch, LLP

(57) ABSTRACT

A unit cell pack having a first battery module including battery cartridges that are sequentially stacked, a plurality of batteries wherein two batteries are seated on an upper surface of each of the battery cartridges, electrode connection members respectively positioned on both sides of the battery cartridges, and a battery cover covering the battery cartridges, the plurality of batteries, and the electrode connection members; a second battery module being adjacent to the first battery module and including same constituent elements as the first battery module; a battery housing surrounding the first battery module and the second battery module, and including air inflow window covers and air outflow window covers facing each other; and a fan duct disposed on the air outflow window covers of the battery (Continued)

housing is provided. A lower surface of each of the battery cartridges defines air guide grooves with respect to each other.

15 Claims, 15 Drawing Sheets

(51) Int. Cl.
  *H01M 10/647* (2014.01)
  *H01M 10/6556* (2014.01)
  *H01M 10/613* (2014.01)
  *H01M 10/48* (2006.01)
  *H01M 10/6563* (2014.01)
  *H01M 2/10* (2006.01)
  *H01M 10/627* (2014.01)

(52) U.S. Cl.
  CPC ............ *H01M 2/20* (2013.01); *H01M 2/206* (2013.01); *H01M 10/486* (2013.01); *H01M 10/613* (2015.04); *H01M 10/627* (2015.04); *H01M 10/647* (2015.04); *H01M 10/6556* (2015.04); *H01M 10/6563* (2015.04); *H01M 2220/10* (2013.01)

(58) Field of Classification Search
  CPC ......... H01M 10/6563; H01M 10/6566; H01M 2220/10; H01M 2/10; H01M 2/1077; H01M 2/20; H01M 2/206
  See application file for complete search history.

(56) References Cited

U.S. PATENT DOCUMENTS

| | | | |
|---|---|---|---|
| 9,065,085 B2 * | 6/2015 | Koh | ............... H01M 2/0212 |
| 9,331,367 B2 | 5/2016 | Shin et al. | |
| 2007/0020516 A1 | 1/2007 | Yoon | |
| 2007/0072066 A1 * | 3/2007 | Yoon | ............... H01M 2/1077 |
| | | | 429/99 |
| 2010/0136420 A1 | 6/2010 | Shin et al. | |
| 2012/0263983 A1 | 10/2012 | Yoon et al. | |
| 2012/0295136 A1 | 11/2012 | Nam et al. | |
| 2013/0122339 A1 * | 5/2013 | Chae | ............... H01M 10/625 |
| | | | 429/99 |

FOREIGN PATENT DOCUMENTS

| | | |
|---|---|---|
| KR | 10-2008-0027506 A | 3/2008 |
| KR | 10-2008-0036259 A | 4/2008 |
| KR | 10-2009-0000302 A | 1/2009 |
| KR | 10-2009-0000313 A | 1/2009 |
| KR | 10-2012-0005727 A | 1/2012 |
| KR | 10-2012-0129384 A | 11/2012 |
| KR | 10-1255241 B1 | 4/2013 |
| KR | 10-2014-0039350 A | 4/2014 |
| KR | 10-2014-0048469 A | 4/2014 |

* cited by examiner

UNIT CELL PACK

TECHNICAL FIELD

The present application claims priority to Korean Patent Application No. 10-2014-0148698 filed on Oct. 29, 2014, and Korean Patent Application No. 10-2014-0149417 filed on Oct. 30, 2014 in the Republic of Korea, the disclosures of which are incorporated herein by reference.

The present disclosure relates to a unit cell pack, and more specifically, to a unit cell pack suitable for expeditiously cooling secondary batteries within a short time by properly entraining heat generated during charging and/or discharging of pouch-shaped secondary batteries on a battery cartridge into air flows of an air passage defined by the battery cartridges in an energy storage system (ESS).

BACKGROUND ART

Recently, energy storage system (ESS) gathers growing attentions as one of the devices to implement the smart grid by considering consumption pattern (time and place of use) of electrical power users. In this case, the energy storage system plays a crucial role for enhancing efficiency of the electrical power management, such as, establishing a bidirectional power supply system, ensuring flexibility of a power transmission and distribution system, preventing blackout, and so on, because it enables storage of the idle power in terms of each of power generation, transmission and distribution, and electrical power consumer.

Accordingly, by using the ESS, the electrical power user may store the idle power during nighttime, and use the stored power during daytime. For the above, because the ESS is provided with the pouch-shaped secondary batteries within a battery pack, the secondary batteries are required by the electrical power user to have high output and high capacity throughout the repeated charging and discharging in the ESS.

However, such demand for high output and high capacity incidentally leads to heat generation from the secondary batteries, which is resulted from the electrochemical reaction of the components within the secondary batteries during repeated charging and discharging of the secondary batteries. This heat generation of the secondary batteries causes heat accumulation in the secondary batteries, deteriorating operation of the secondary battery. The deteriorated operation of the secondary battery shortens a service life of the ESS.

In order to minimize the heat accumulation in the secondary battery, Korean Patent Application No. 10-2009-0000302, published on Jan. 7, 2009, discloses a 'Large and medium battery pack having excellent cooling efficiency.' For cooling the secondary batteries, the large and medium battery pack is configured such that refrigerant (air) is introduced into an upper end of one side of a front surface, flowed in a vertically-downward direction between battery modules (including the secondary batteries), and then flowed out of a lower end of the one side of the front surface. That is, because a refrigerant passage is formed to be in a U shape within the large and medium battery pack, the large and medium battery pack needs a lengthy time to cool the secondary batteries, due to the refrigerant passage being longer than a length of the large and medium battery pack itself.

Further, Korean Patent Application No. 10-2009-0000313, published on Jan. 7, 2009, discloses a large and medium battery pack with enhanced cooling efficiency. The large and medium battery pack with enhanced cooling efficiency is configured such that, for cooling the secondary batteries, the refrigerant (air) is introduced into an upper end of a rear surface, flowed in a vertically-downward direction between module assemblies (including the secondary batteries), and continue to be flowed out of a lower end of a front surface. That is, because the refrigerant passage is formed as a part of a gammadion character shape '卍' within the large and medium battery pack, the large and medium battery pack needs a long time for cooling the secondary batteries because it locally confines hot air therewithin.

Referring to the related art described above, the ESS shows a configuration which is difficult to expeditiously cool the secondary batteries in the battery pack (hereinbelow, 'batteries') within a short time.

DISCLOSURE

Technical Problem

The present disclosure is designed to solve the problems of the related art, and therefore, the present disclosure is directed to providing a unit cell pack of an energy storage system (ESS) suitable for focusing air flows to batteries by having consistent air flows without irregularities within at least one battery module including battery cartridges and pouch-shaped batteries.

The present disclosure is also directed to providing a unit cell pack of the ESS suitable for reducing an amount of the heat generated during charging and/or discharging of the batteries within a short time, by accelerating the air flows within a battery housing surrounding at least one battery module.

The present disclosure is also directed to providing a unit cell pack of the ESS suitable for enhancing degree of freedom in arranging the battery cartridges and the batteries within the battery housing surrounding at least one battery module, by properly coupling the battery cartridges within at least one battery module.

The present disclosure is also directed to providing a unit cell pack of the ESS suitable for facilitating an assembly process of the battery cartridges and the batteries by simplifying electrical connection between the battery cartridges and the pouch-shaped batteries within at least one battery module, and electrical connection of the battery cartridges.

The present disclosure is also directed to providing a unit cell pack of the ESS suitable for preventing contact between at least one battery module and the battery housing surrounding the battery module from an external physical influence.

The present disclosure is also directed to providing a unit cell pack of the ESS suitable for preventing air leakage from the battery housing and/or a region between the battery housing and a fan duct, by securing the sealing during the assembly of the battery housing surrounding at least one battery module and during coupling of the battery housing and the fan duct positioned on a peripheral region of the battery housing.

Technical Solution

In one aspect of the present disclosure, there is provided a unit cell pack, which may include: a first battery module comprising battery cartridges that are sequentially stacked, a plurality of batteries wherein two batteries are seated on an upper surface of each of the battery cartridges, electrode connection members respectively positioned on both sides of the battery cartridges, and a battery cover covering the battery cartridges, the plurality of batteries, and the electrode connection members; a second battery module being adjacent to the first battery module and including same constituent elements as the first battery module; a battery housing surrounding the first battery module and the second battery module, and including air inflow window covers and air outflow window covers facing each other; and a fan duct disposed on the air outflow window covers of the battery housing, wherein the two batteries on the upper surface of each of the battery cartridges are electrically connected in parallel, in which the battery cartridges are electrically connected in series through the electrode connection members, a lower surface of each of the battery cartridges defines air guide grooves with respect to each other, and the air guide grooves are aligned with the air inflow window covers and the air outflow window covers on one of the first battery module and the second battery module, forming straight air passages.

The battery cartridges may be formed such that, between the two adjacent battery cartridges, a hollow portion may be formed through the air guide grooves at a central region, and the battery cartridges may contact each other at a peripheral region with edges parallel to the air guide grooves.

Each of the battery cartridges may an injection molded part, and include two battery seating portions, bus bars positioned between the battery seating portions, and a cartridge coupling ring positioned between the bus bars to connect the battery seating portions, and the battery seating portions and the cartridge coupling ring may include an insulating material.

The battery seating portions and the bus bars may respectively define insertion grooves on opposite sides of the cartridge coupling ring between the battery seating portions.

The bus bars, at a peripheral region of the insertion grooves, may include coupling grooves on one side and fastening members on a side surface vertical to the one surface, and the bus bars and the fastening members may include a conductive material.

The cartridge coupling ring may include a through hole passing through a central region, and a fitting member protruding from an inlet of one side portion of the through hole, the one side portion of the through hole may have a diameter smaller than that of the other side portion of the through hole, an external diameter of the fitting member may be smaller than a diameter of the other side portion of the through hole, and the fitting member and the through hole may fit-couple the two adjacent battery cartridges.

Each of the battery cartridges may include: temperature sensor seating portions being formed across the lower surface and the upper surface, being exposed immediately below one of the two batteries, and respectively protruding from the edges parallel to the air guide grooves toward the air guide grooves; and temperature sensor entrances respectively exposing internal passages of the temperature sensor seating portions through the side surfaces between the lower surface and the upper surface.

The temperature sensor seating portions may include at least one temperature sensor in the battery cartridge positioned at a center among the battery cartridges.

On the upper surface of each of the battery cartridges, the two batteries may be connected with each other with electrodes of same polarity with laser, and brought into contact with the bus bars with the electrodes of same polarity by thermal bonding.

The electrode connection members may be electrically connected with electrodes of a plurality of batteries by being inserted into insertion grooves of the battery cartridges, ring-coupled with coupling grooves of the bus bars of an uppermost battery cartridge in the battery cartridges, and screw-coupled with the coupling members of the battery cartridges.

The first battery module may additionally include a cartridge fixating plate positioned below the battery cartridges, and part covers respectively surrounding the electrode connection members with the cartridge fixating plate, the battery cartridges, a plurality of batteries, and the battery cover.

The battery housing may additionally include: a lower plate; an upper plate; a first side plate positioned between the air inflow window covers and a second side plate positioned between the air outflow window covers, the first side plate and the second side plate facing each other between the lower plate and the upper plate and connecting the lower plate and the upper plate; and a third side plate and a fourth side plate positioned vertically to the first side plate and the second side plate between the lower plate and the upper plate, and facing each other.

The air inflow window covers and the air outflow window covers may be screw-coupled with the lower plate, the battery cover, the upper plate, the third side plate and the fourth side plate, while being tightly joined to the battery cover. The air outflow window covers may ethylene propylene diene monomers. The first side plate and the second side plate may be fit-coupled with the air inflow window covers and the air outflow window covers. The first side plate, the second side plate, the third side plate, and the fourth side plate may be screw-coupled with the lower plate and the upper plate.

The fan duct may include air suction boards respectively defining air inlets while respectively surrounding the air outflow window covers, an air blowing board defining an air collector while being positioned between the air suction boards, and a blowing fan structure inserted into the air blowing board, in which each of the air suction boards and the air blowing board may be separable through a central region in a direction vertical to a direction in which the first battery module and the second battery module are arranged.

The air suction boards and the air blowing board may be connected in fluid communication with each other through the air inlets and the air collector, and the blowing fan structure may suction air from the battery housing through the air inflow window covers, the air outflow window covers, the air inlets, and the air collector, and transmit the air externally from the fan duct.

Advantageous Effects

The present disclosure gives the following effects. According to an aspect of the present disclosure, compared to a related art, a unit cell pack may further focus air flows of a straight air passage on each of the batteries, by alternately stacking battery cartridges and pouch-shaped batteries within at least one battery module and providing at least one straight air passage on a lower surface of each of the battery cartridges.

According to an aspect of the present disclosure, compared to a related art, the unit cell pack may further reduce an amount of the heat generated during charging and/or discharging of the batteries compared to a related art, by including a fan duct at a peripheral region of a battery housing surrounding at least one battery module and accelerating air flows on an internal portion of the battery housing.

According to an aspect of the present disclosure, compared to a related art, the unit cell pack may reduce a volume of the battery module and increase an area occupied by the battery module in the battery housing surrounding at least one battery module, by bringing the battery cartridges to contact with each other at edges of the battery cartridges of at least one battery module, thus further enhancing degree of freedom of arranging the battery cartridges and the batteries vertically and horizontally.

According to an aspect of the present disclosure, compared to a related art, the unit cell pack may electrically connect the battery cartridges to bus bars by thermally bonding the batteries to the bus bars of the injection molded battery cartridges of at least one battery module and inserting electrode connection members into the battery cartridges, thus further facilitating an assembly process of the battery cartridges and the batteries.

According to an aspect of the present disclosure, compared to a related art, the unit cell pack may further prevent movement of the battery module within the battery housing when applied with an external physical influences, because at least one battery module and the battery housing surrounding the battery module are screw-coupled.

According to an aspect of the present disclosure, compared to a related art, the unit cell pack may reinforce the sealing by using at least one ethylene propylene diene monomer (EPDM) when coupling at least one battery module and the battery housing surrounding the battery module, assembling the battery housing, and coupling the battery housing and the fan duct, thus further preventing air leakage from the battery housing and/or a region between the battery housing and the fan duct.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, and not intended to limit the scope of the disclosure, so it should be understood that other equivalents and modifications could be made thereto without departing from the spirit and scope of the disclosure.

In the description provided below, a battery refers to a lithium secondary battery. The "lithium secondary battery" as used herein encompasses a secondary battery in which lithium ions act as the operating ions and thereby inducing electrochemical reaction in the positive electrode and the negative electrode during charging and discharging.

Meanwhile, while the name of the battery may vary according to types of electrolyte or separator used in the lithium secondary battery, types of packaging materials used for packing the lithium secondary battery, inner or outer structure of the lithium secondary battery, and so on, the battery is to be interpreted as falling under the scope of the lithium secondary battery described above as long as lithium ions are used for operating ions in such battery.

The present disclosure is applicable to other batteries as well as the lithium secondary battery. Accordingly, irrespective of the type of the battery, even the battery having operating ions other than lithium ions is to be interpreted as falling under the scope of the present disclosure as long as such battery can apply the technical concept of the present disclosure.

Further, the battery is not limited by the number of elements constructing the same. Accordingly, the battery may include an assembly of positive electrode/separator/negative electrode, and an electrolyte within one packaging material.

Figure 1:
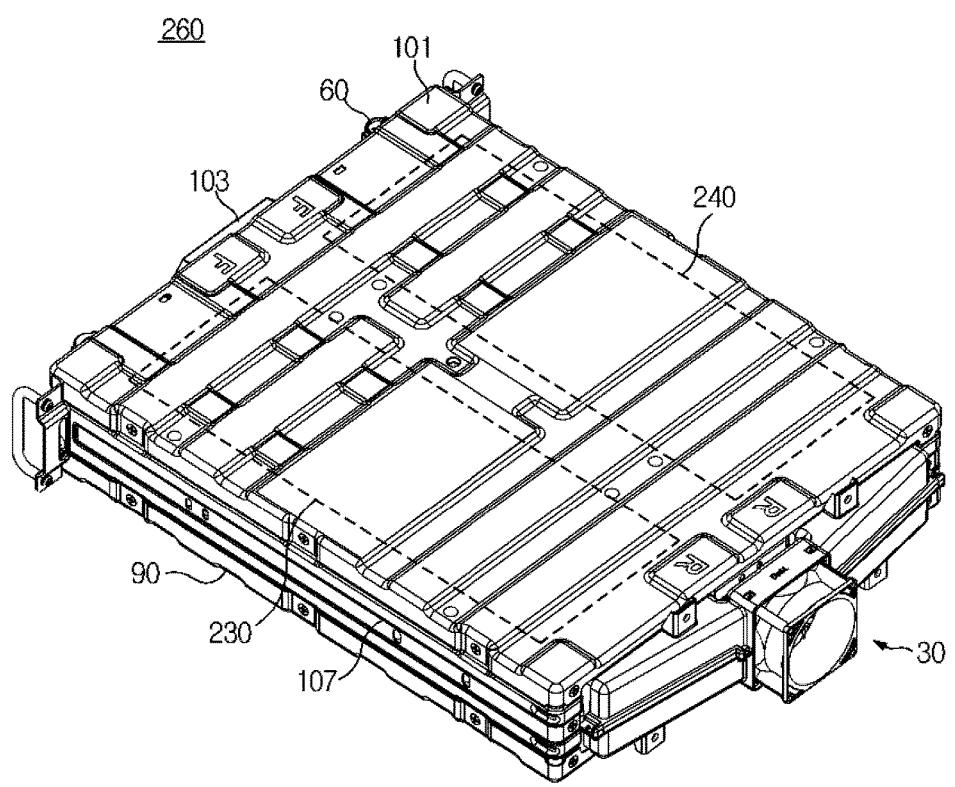
FIGS. 1 and 2 are perspective views illustrating a unit cell pack of an energy storage system (ESS) according to exemplary embodiments.
Figure 2:
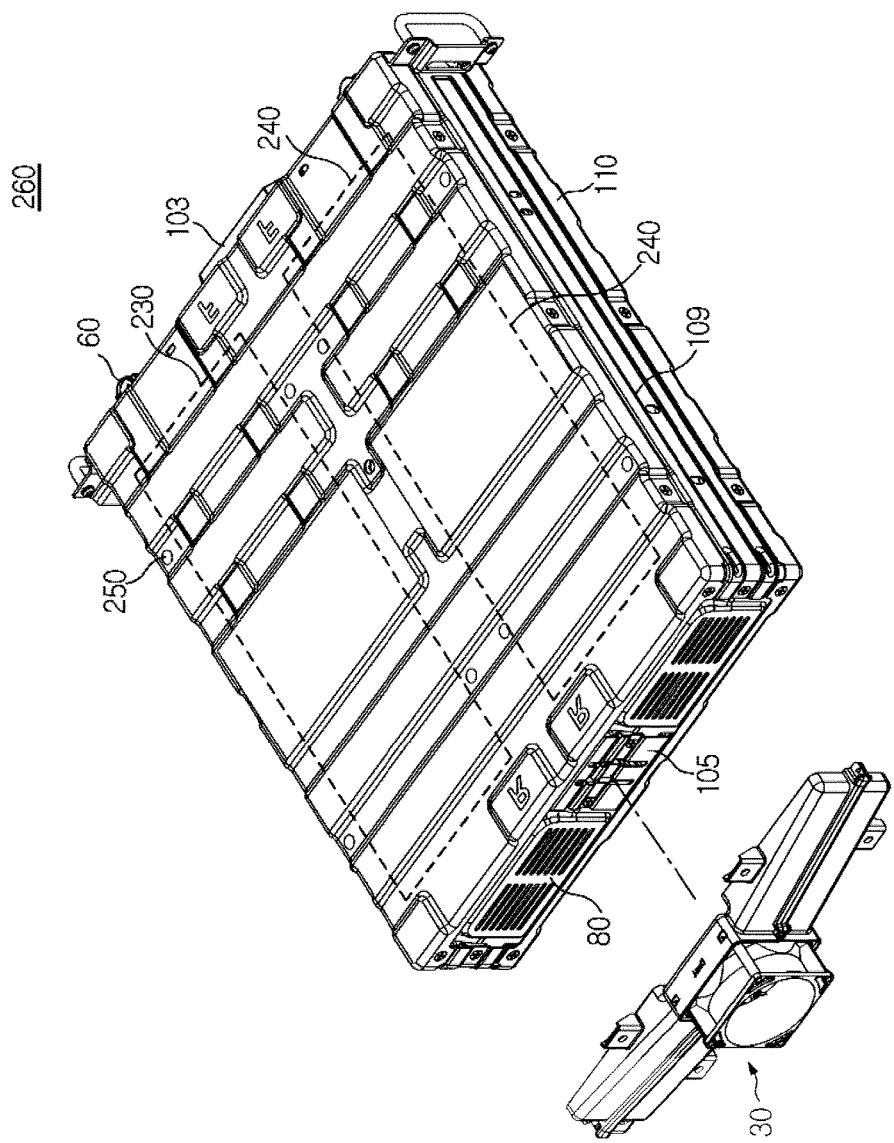

FIGS. 1 and 2 are perspective views illustrating a unit cell pack of an energy storage system (ESS) according to exemplary embodiments.

Referring to FIGS. 1 and 2, the unit cell pack 260 includes a fan duct 30, a battery housing 110, a first battery module 230, and a second battery module 240. The fan duct 30 may be positioned on the battery housing 110 and screw-coupled with the battery housing 110. The fan duct 30 may be configured to suction air from the battery housing 110 and transmit the air externally from the battery housing 110.

The battery housing 110 may surround the first battery module 230 and the second battery module 240. The battery housing 110 includes air inflow window covers 60, air outflow window covers 80, a lower plate 90, an upper plate 101, a first side plate 103, a second side plate 105, a third side plate 107 and a fourth side plate 109. The air inflow window covers 60 and the air outflow window covers 80 may be sequentially positioned toward the fan duct 30 along one direction of the battery housing 110.

The lower plate 90 and the upper plate 101 may be respectively positioned on a lower side and an upper side of the battery housing 110. The first side plate 103 may be positioned between the air inflow window covers 60. The second side plate 105 may be positioned between the air outflow window covers 80. The third side plate 107 and the fourth side plate 109 may be sequentially positioned along a direction vertical to one direction of the battery housing 110.

The first battery module 230 and the second battery module 240 may be disposed in parallel with each other within the battery housing 110. The first battery module 230 and the second battery module 240 may include same constituent elements. The description of the constituent elements of the second battery module 240 will be referenced to the description of the constituent elements of the first battery module 230. Further, the fan duct 30, the battery housing 110, the first battery module 230 and the second battery module 240 will be more specifically explained below by referring to FIGS. 2 to 20.

Figure 3:
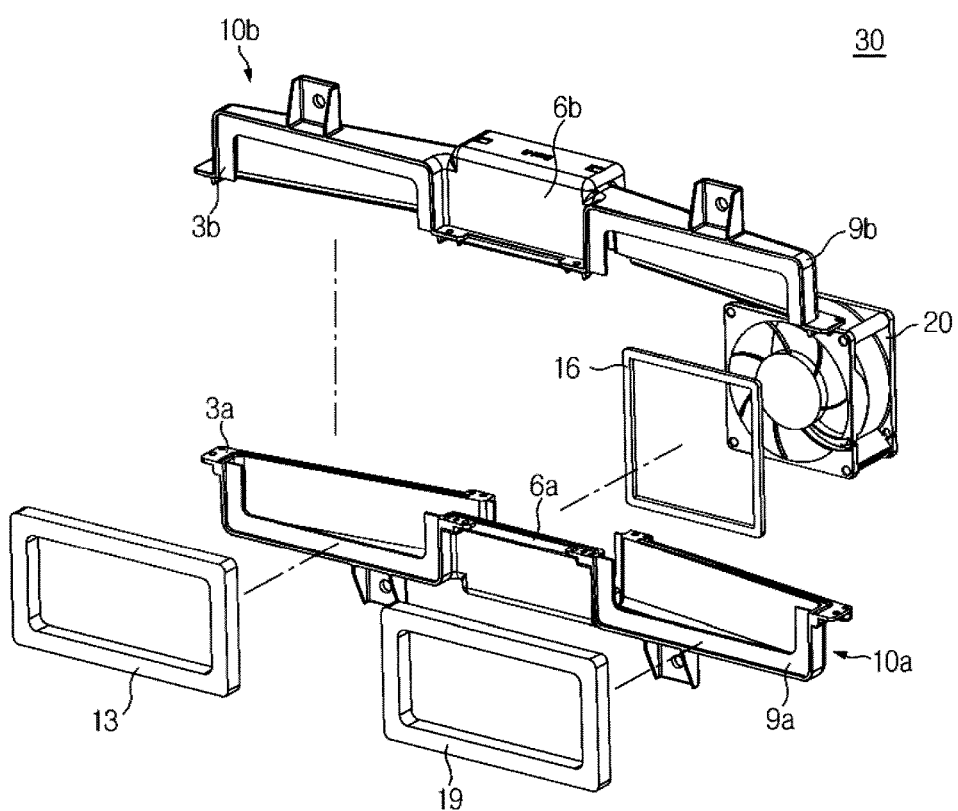
FIG. 3 is an exploded perspective view illustrating a fan duct of the unit cell pack of FIG. 2.

FIG. 3 is an exploded perspective view illustrating a fan duct of the unit cell pack of FIG. 2.

Referring to FIG. 3, the fan duct 30 may include a lower fan duct cover 10a, an upper fan duct cover 10b, three ethylene propylene diene monomers (EPDM) 13, 16, 19, and a blower fan structure 20. The lower fan duct cover 10a and the upper fan duct cover 10b may be separated from each other in a direction vertical to a direction in which the first battery module 230 and the second battery module 240 of FIG. 1 are arranged.

The lower fan duct cover 10a may include lower air suction boards 3a, 9a respectively positioned on one side portion and another side portion, and a lower air blowing board 6a positioned between the lower air suction boards 3a, 9a and formed integrally with the lower air suction boards 3a, 9a. The lower air suction boards 3a, 9a may respectively include recesses open in one direction, and the lower air blowing board 6a may include a recess open in the other direction (not illustrated). The recesses of the lower air suction boards 3a, 9a may be connected in fluid communication with the recess of the lower air blowing board 6a.

The upper fan duct cover 10b may include upper air suction boards 3b, 9b respectively positioned on one side and the other side, and an upper air blowing board 6b positioned between the upper air suction boards 3b, 9b and formed integrally with the upper air suction boards 3b, 9b. The upper air suction boards 3b, 9b may respectively include recesses open in one direction, and the upper air blowing board 6b may include a recess open in the other direction (not illustrated). The recesses of the upper air suction boards 3b, 9b may be connected in fluid communication with the recess of the upper air blowing board 6b.

The lower fan duct cover 10a and the upper fan duct cover 10b may be screw-coupled through end portions thereof facing each other on a central region. Two ethylene propylene diene monomers 13, 19 of the ethylene propylene diene monomers 13, 16, 19 may be arranged in the recesses of the lower air suction boards 3a, 9a and the upper air suction boards 3b, 9b. The other one 16 of the ethylene propylene diene monomers 13, 16, 19 may be arranged in the recesses of the lower air blowing board 6a and the upper air blowing board 6b. The blowing fan structure 20 may be arranged in the recesses of the lower air blowing board 6a and the upper air blowing board 6b. The blowing fan structure 20 may include a suction fan.

Figure 4:
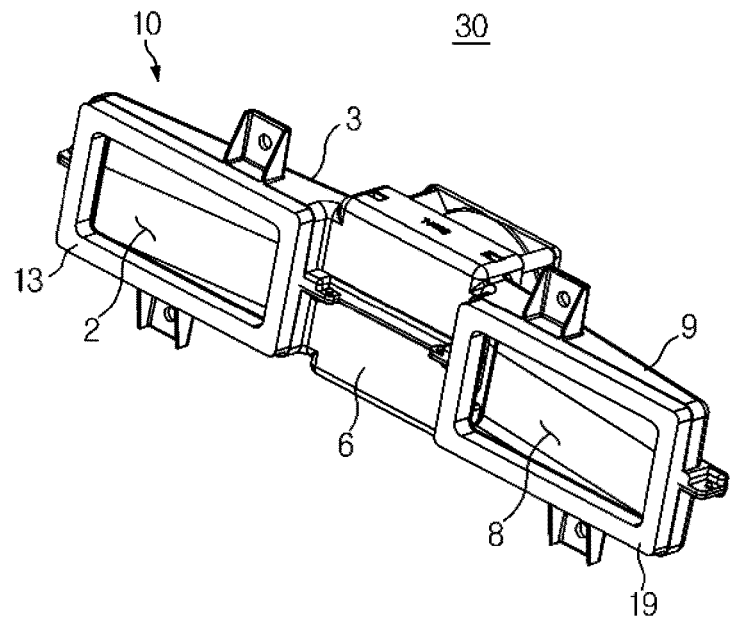
FIG. 4 is a perspective view illustrating a rear portion of a fan duct within the unit cell pack of FIG. 2.
Figure 5:
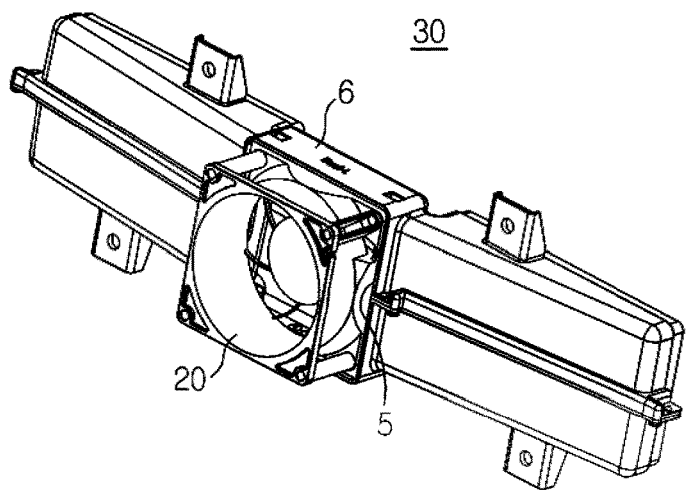
FIG. 5 is a perspective view illustrating a front portion of a fan duct within the unit cell pack of FIG. 2.

FIG. 4 is a perspective view illustrating a rear surface of the fan duct within the unit cell pack of FIG. 2, and FIG. 5 is a perspective view illustrating a front surface of the fan duct within the unit cell pack of FIG. 2.

Referring to FIGS. 4 and 5, the lower fan duct cover 10a and the upper fan duct cover 10b of FIG. 3 may constitute the fan duct cover 10 through screw-coupling. The fan duct cover 10, the ethylene propylene diene monomers 13, 16, 19 of FIG. 3, and the blowing fan structure 20 may constitute the fan duct 30. The fan duct 10 may include the air suction boards 3, 9 positioned on one and the other sides, and the air blowing board 6 positioned between the air suction boards 3, 9. The air suction boards 3, 9 may respectively surround the air outflow window covers 60 of FIG. 1, and respectively define the air inlets 2, 8.

The air blowing board 6 may define an air collector 5. The air suction boards 3, 9 and the air blowing board 6 may be connected with each other in fluid communication through the air inlets 2, 8 and the air collector 5. The blowing fan structure 20 may be inserted into the air collector 5 of the air blowing board 6. Meanwhile, the ethylene propylene diene monomers 13, 19 may be respectively attached to the air suction boards 3, 9. The ethylene propylene diene monomers 13, 19 may be tightly joined with the air outflow window covers 80 of the battery housing 110 of FIG. 2, upon screw-coupling of the fan duct 30 with the air outflow window covers 80.

The ethylene propylene diene monomers 13, 19 may securely seal regions between the fan duct 30 and the air outflow window covers 80. Further, the ethylene propylene diene monomer 16 may be inserted into the air collector 5 of the air blowing board 6 with the blowing fan structure 20. The blowing fan structure 20 may be tightly joined with the air blowing board 6 through the air collector 5 through the medium of the ethylene propylene diene monomer 16. The ethylene propylene diene monomer 16 may securely seal between the air blowing board 6 and the blowing fan structure 20.

The blowing fan structure 20 may be configured to suction air from the battery housing 110 through the air inflow window covers 60, the air outflow window covers 80, the air inlets 2, 8 and the air collector 5 of FIG. 1, and transmit the air externally from the fan duct 30.

Figure 6:
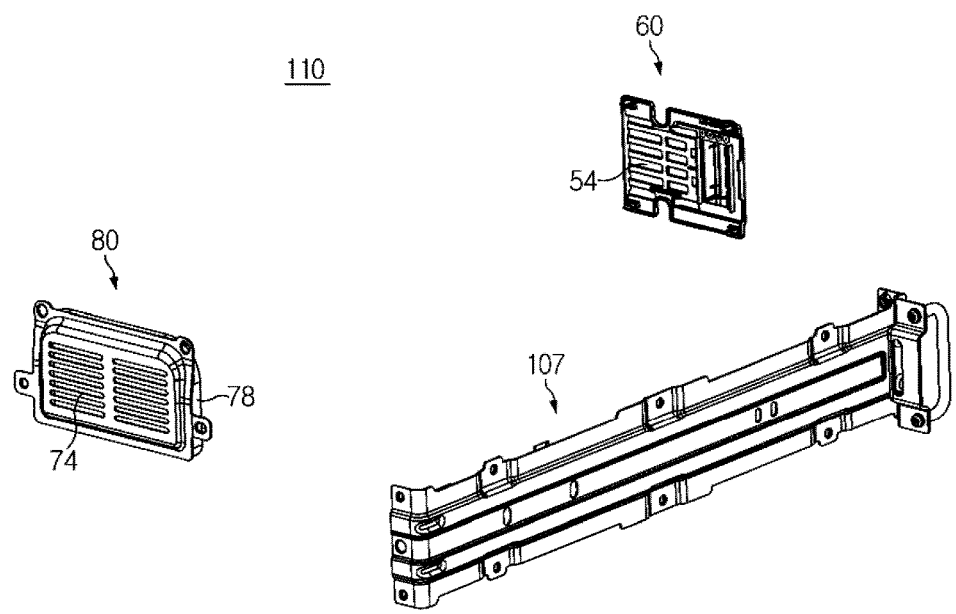
FIG. 6 is an exploded perspective view partially illustrating a battery housing of the unit cell pack of FIG. 2.

FIG. 6 is an exploded perspective view partially illustrating a battery housing of the unit cell pack of FIG. 2.

Referring to FIG. 6, the battery housing 110 may include the air inflow window cover 60, the air outflow cover 80 and the third side plate 107, which are separated from one another. In this case, when considering FIGS. 1 and 2, the battery housing 110 has two of each of the air inflow window cover 60 and the air outflow window cover 80 correspondingly to the first battery module 230 and the second battery module 240.

Further, when considering FIGS. 1 and 2 again, the battery housing 110 may additionally include the lower plate 90 separated from the air inflow window covers 60, the air outflow window covers 80, and the third side plate 107, the upper plate 101, the first side plate 103, the second side plate 105, and the fourth side plate 109.

Accordingly, the battery housing 110 may be implemented by screw-coupling the air inflow window covers 60, the air outflow window covers 80, the lower plate 90, the upper plate 101, the first side plate 103, the second side plate 105, the third side plate 107, and the fourth side plate 109 with one another.

Each of the air outflow window covers 80 may include air outflow windows 74 and the ethylene propylene diene monomer 78. Meanwhile, the first battery module 230 or the second battery module 240 may be positioned between the air inflow window covers 60 and the air outflow window covers 80.

Figure 7:
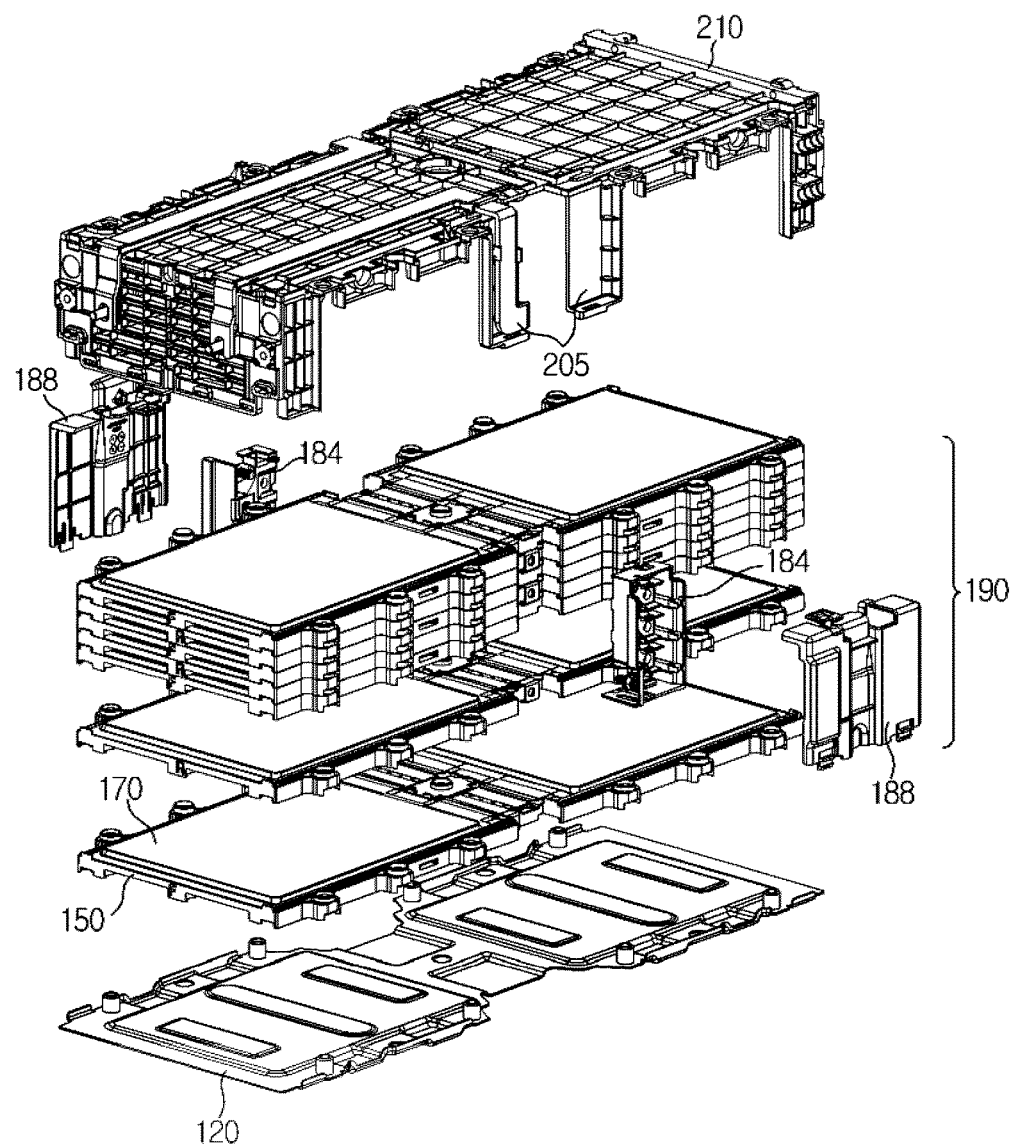
FIG. 7 is an exploded perspective view illustrating a battery module of the unit cell pack of FIG. 2.

FIG. 7 is an exploded perspective view illustrating a battery module of the unit cell pack of FIG. 2.

Referring to FIG. 7, the first battery module 230 may include the cartridge fixating plate 120, the battery cartridges 150, a plurality of batteries 170, the electrode connection members 184, cover members 184, and a battery cover 210. The cartridge fixating plate 120 may be positioned under the battery cartridges 150 and a plurality of batteries 170. The battery cartridges 150 and a plurality of batteries 170 may be positioned on the cartridge fixating plate 120 and alternately stacked.

More specifically, the battery cartridges 150 may be sequentially stacked on the cartridge fixating plate 120. The battery cartridges 150 are formed such that a hollow portion is formed between the two adjacent battery cartridges 150 through air guide grooves 142, 144 of FIG. 9 at a central region, and may be contacted with each other at the edges parallel to the air guide grooves 142, 144 at a peripheral region.

A plurality of batteries 170 may be formed to be a pouch shape. A plurality of batteries 170 may be seated such that two batteries 170 are seated on an upper surface of each of the battery cartridges 150. The two batteries 170 on the upper surface of each of the battery cartridges 150 may be electrically connected in parallel. The battery cartridges 150 and a plurality of batteries 170 may configure a battery stack 190.

Meanwhile, the electrode connection members 184 may be respectively positioned on both side portions of the battery cartridges 150. The electrode connection members 184 may be configured to electrically connect the battery cartridges 150 in series. The battery cover 210 may cover the battery cartridges 150, a plurality of batteries 170, and the electrode connection members 184. In this example, the battery cover 210 may respectively have receivers 205 on both side portions. The cover members 184 may be respectively inserted into the receivers 205 of the battery cover 210, and respectively cover the electrode connection members 184.

Figure 8:
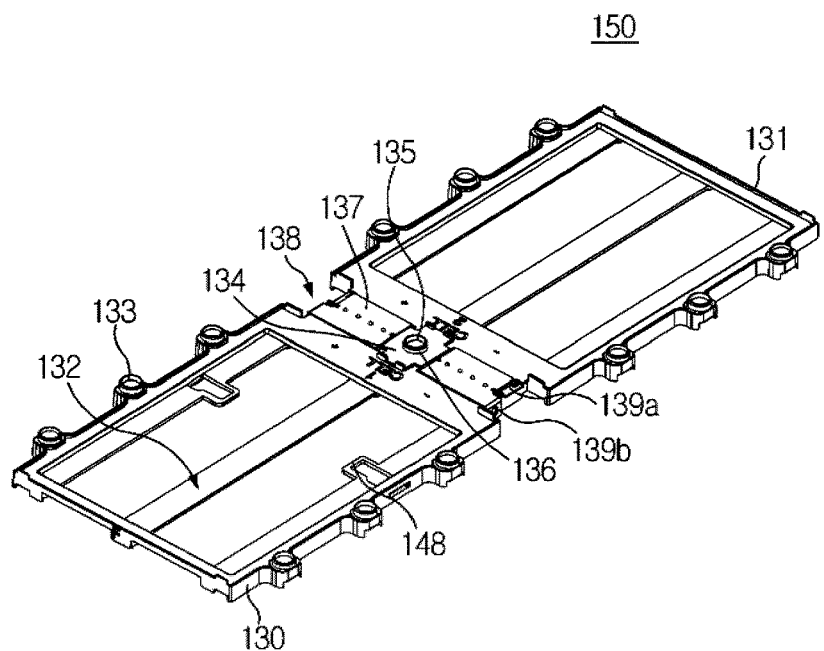
FIG. 8 is a perspective view illustrating an upper surface of a battery cartridge of the battery module in FIG. 7.
Figure 9:
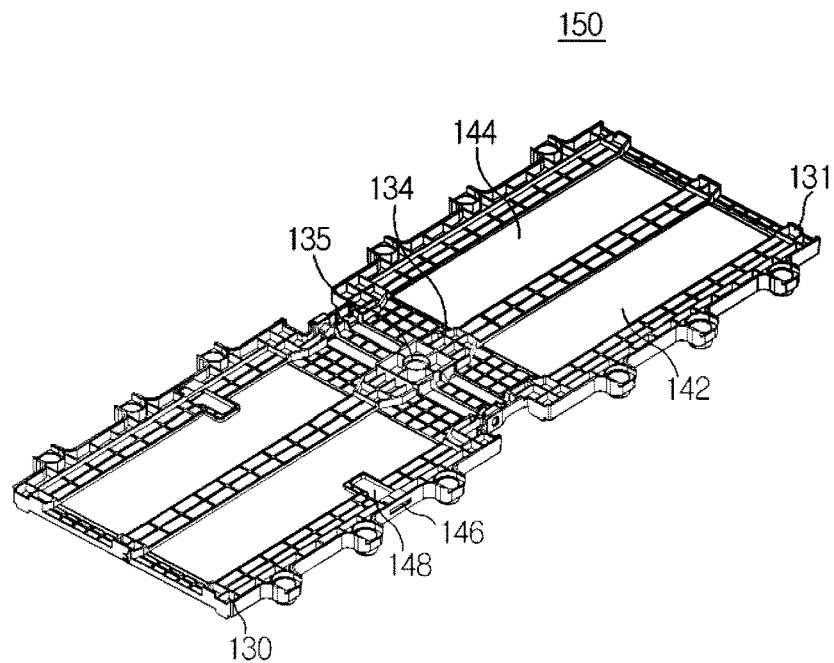
FIG. 9 is a perspective view illustrating a lower surface of a battery cartridge of the battery module in FIG. 8.

FIG. 8 is a perspective view illustrating an upper surface of the battery cartridge in the battery module of FIG. 7, and FIG. 9 is a perspective view illustrating a lower surface of the battery cartridge in the battery module of FIG. 8.

Referring to FIG. 8, the battery cartridge 150, which is an injection molded part, may include the two battery seating portions 130, 131, a cartridge coupling ring 134, and bus bars 137. The battery seating portions 130, 131 may be sequentially positioned in a direction from the air inflow window cover 60 of FIG. 6 toward the air outflow window cover 80. The battery seating portions 130, 131 may respectively define battery seating grooves 132 on the upper surface of the battery cartridge 150.

The battery seating portions 130, 131 may include guide holes 133 around the battery seating grooves 132. The cartridge coupling ring 134 may be positioned between the battery seating portions 130, 131 and configured to connect the battery seating portions 130, 131. The cartridge coupling ring 134 may include a through hole 135 extended through a central region, and a fitting member 136 protruding from an inlet of one side portion of the through hole 135. The one side portion of the through hole 135 may have a diameter smaller than that of the other side portion of the through hole 135 illustrated in FIG. 9.

An external diameter of the fitting member 136 may be smaller than a diameter of the other side portion of the through hole 135. The through hole 135 and the fitting member 136 may fit-couple the two adjacent battery cartridges 150 in FIG. 7 with each other. The battery seating portions 130, 131 and the cartridge coupling ring 134 may include an insulating material. Meanwhile, the bus bars 137 may be positioned between the battery seating portions 130, 131. In this case, the cartridge coupling ring 134 may be positioned between the bus bars 137.

The battery seating portions 130, 131 and the bus bars 137 may respectively define insertion grooves 138 on opposite sides of the cartridge coupling ring 134 between the battery seating portions 130, 131. The bus bars 137 may include, on a peripheral region of the insertion grooves 138, coupling grooves 139a on one surface and fastening members 139b on a side vertical to the one surface. The bus bars 137 and the coupling members 139b may include a conductive material.

Referring to FIG. 9, the battery cartridge 150 may define the air guide grooves 142, 144 which are parallel to each other on the lower surface. Specifically, the air guide grooves 142, 144 may be referred to as a first passage 142 and a second passage 144 which are formed in a length direction of the battery cartridge 150. The first passage 142 and the second passage 144 may be formed to be extended in frontward and rearward directions on a bottom portion of the arrangement of the two batteries 170, and a front communicated portion 145a and a rear communicated portion 145b may be formed respectively on a front region and a rear region. According to the concept described above, for example, external air flowing into both sides of the front communicated portion 145a may flow along the first air passage 142 and the second air passage 144, along a bottom surface of the arrangement of the two batteries 170, and discharged along the rear communicated portion 145b, thus facilitating discharging of the heat generated from the battery cartridge.

The air guide grooves 142, 144 may be extended from the air inflow window cover 60 of FIG. 6 to the air outflow window cover 80. The air guide grooves 142, 144 may be aligned with the air inflow window cover 60 and the air outflow window cover 80 to form a straight air passage.

Further, when considering FIG. 8, the battery cartridge 150 may include temperature sensor entrances 146 respectively positioned on side surfaces between a lower surface and an upper surface, and temperature sensor seating portions 148 formed across the lower surface and the upper surface. The temperature sensor entrances 146 and the temperature sensor seating portions 148 may be connected in fluid communication with each other. The temperature sensor entrances 146 may respectively expose internal spaces of the temperature sensor seating portions 148.

The temperature sensor seating portions 148 may be respectively protruding from the air guide grooves 142, 144 immediately below one of the two batteries 170 of FIG. 10, for example, from the edges exposed on the upper surface and parallel to the air guide grooves 142, 144.

Figure 10:
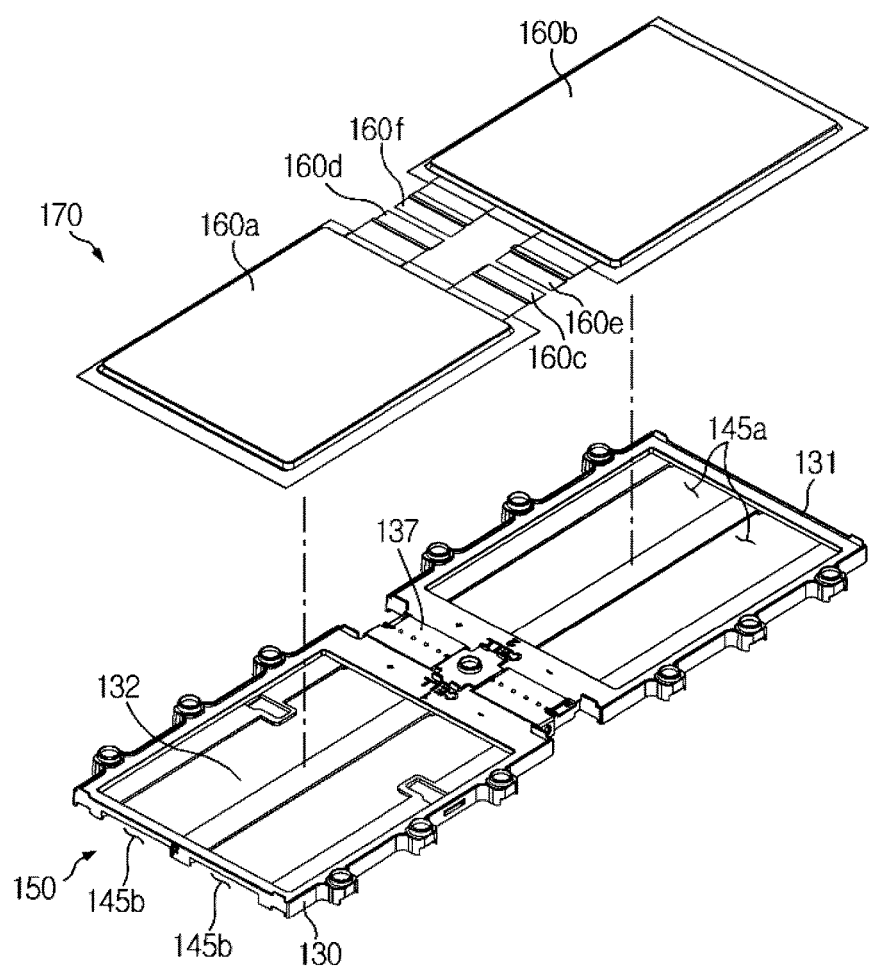
FIG. 10 is an exploded perspective view illustrating coupling relations between a battery cartridge and batteries within the battery module of FIG. 7.
Figure 11:
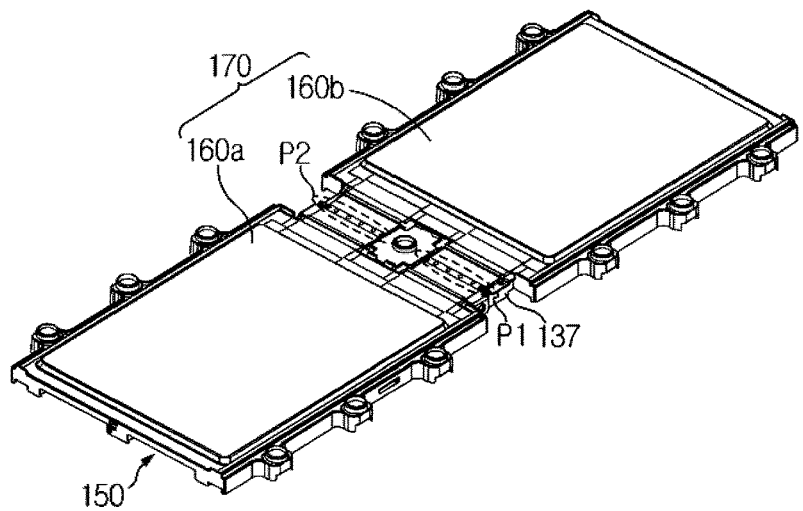
FIG. 11 is a perspective view illustrating coupling relations of a battery cartridge and batteries within the battery module of FIG. 10.

FIG. 10 is an exploded perspective view illustrating coupling relations between the battery cartridges and the batteries within the battery module of FIG. 7, and FIG. 11 is a perspective view illustrating coupling relations of the battery cartridges and the batteries within the battery module of FIG. 10.

Referring to FIG. 10, the battery cartridge 150 may be specifically described in FIGS. 8 and 9. The batteries 170 may be divided into the two batteries, i.e., the first battery 160a and the second battery 160b. The first battery 160a and the second battery 160b may respectively correspond to the battery seating portions 130, 131 of the battery cartridge 150. More specifically, the first battery 160a and the second battery 160b may respectively have occupying regions in the battery seating grooves 132 of the battery seating portions 130, 131.

The electrodes 160c, 160d, 160e, 160f of the first battery 160a and the second battery 160b may respectively correspond to the bus bars 137 of the battery cartridge 150. In this case, the electrode 160c of the first battery 160a may be arranged to face the electrode 160e of the second battery 160b, with same polarity. Further, the electrode 160d of the first battery 160a may be arranged to face the electrode 160f of the second battery 160b, with same polarity.

Referring to FIG. 11, the first battery 160a and the second battery 160b on an upper surface of the battery cartridge 150 may be connected to each other with the electrodes 160c, 160e, 160d, 160f of the same polarity by laser, and contacted to check regions P1, P2 of the bus bars 137 with the electrodes 160c, 160e, 160d, 160f of same polarity by heat fusing. The electrodes 160c, 160e; 160d, 160f and the bus bars 137 may configure electrical circuit lines while being insulated with the cartridge coupling ring 137.

Figure 12:
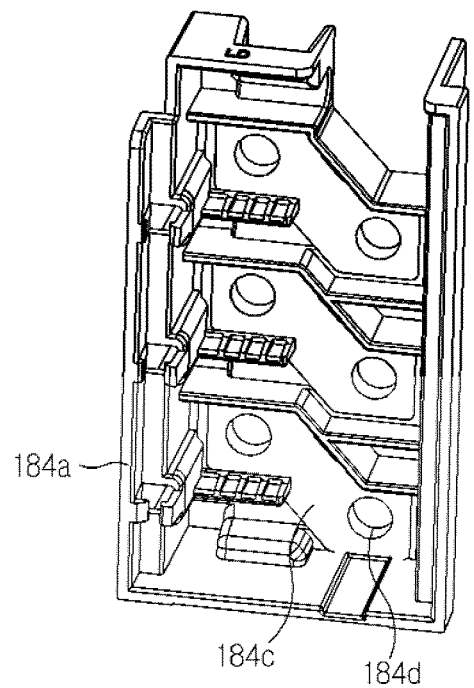
FIG. 12 is a perspective view magnifying and illustrating an inner portion of an electrode connection member of the battery module in FIG. 7.
Figure 13:
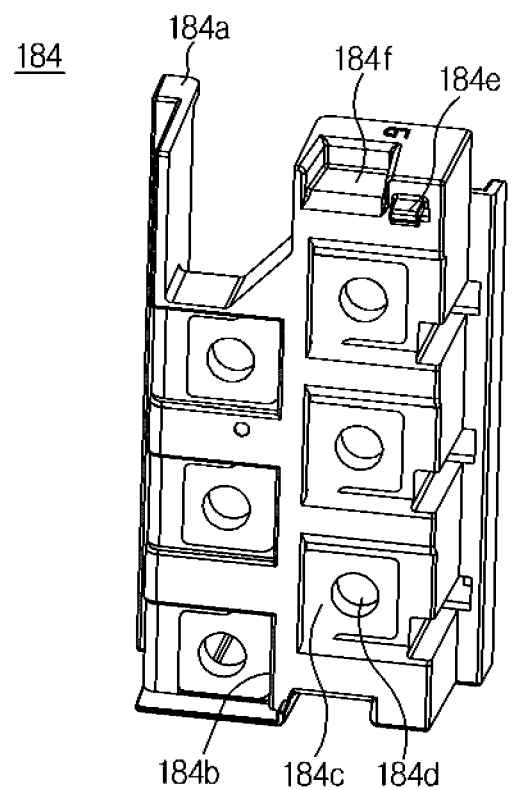
FIG. 13 is a perspective view magnifying and illustrating an external portion of an electrode connection member of the battery module in FIG. 7.

FIG. 12 is a perspective view magnifying and illustrating an inner portion of the electrode connection member of the battery module of FIG. 7, and FIG. 13 is a perspective view magnifying and illustrating an external portion of the electrode connection member of the battery module of FIG. 7.

Referring to FIGS. 12 and 13, the electrode connection member 184 may include a connection body 184a. The connection body 184a may be formed in a box shape. The connection body 184a may include connection holes 184b penetrating through one sidewall. The connection holes 184b may be disposed in a zigzag shape on the connection body 184a. The connection body 184b may include connection electrodes 184c covering the connection holes 184b internally.

More specifically, the connection electrodes 184c may be formed to be a partial shape of a gammadion character 卍, and may be sequentially stacked on the connection body 184a. The connection electrodes 184c may be exposed externally from the connection body 184a through the connection holes 184b. Meanwhile, the connection body 184a may include a protrusion 184e and a groove 184f externally.

Herein, when the battery cartridge 150 of FIG. 8 is expanded to the battery cartridge 150 of FIG. 7 and the electrode connection member 184 is inserted into the insertion grooves 138 of the battery cartridges 150, the connection electrodes 184c may be contacted with the fastening member 139b of the battery cartridges 150 through the connection holes 184b of the connection body 184a. Further, the protrusion 184e may be ring-coupled with the groove 139a of an uppermost battery cartridge 150 of the battery cartridges 150. The groove 184f may receive a portion of the cover member 188 of FIG. 14 seated therein.

Figure 14:
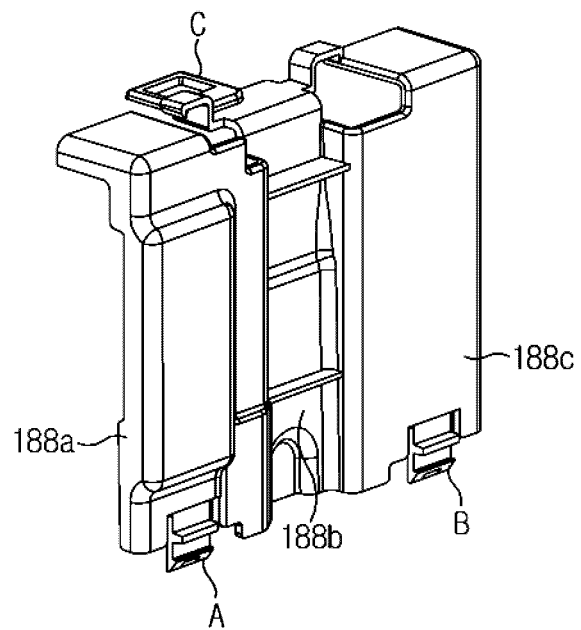
FIG. 14 is a perspective view illustrating a cover member of the battery module of FIG. 7.

FIG. 14 is a perspective view illustrating a cover member of the battery module of FIG. 7.

Referring to FIG. 14, the cover member 188 may include a first cover body 188a, a second cover body 188b, and a third cover body 188c, which are sequentially positioned from one side to the other side. The first cover body 188a, the second cover body 188b, and the third cover body 188c may be formed integrally. The first cover body 188a and the third cover body 188c may respectively have press members A, B on lower sides.

Figure 17:
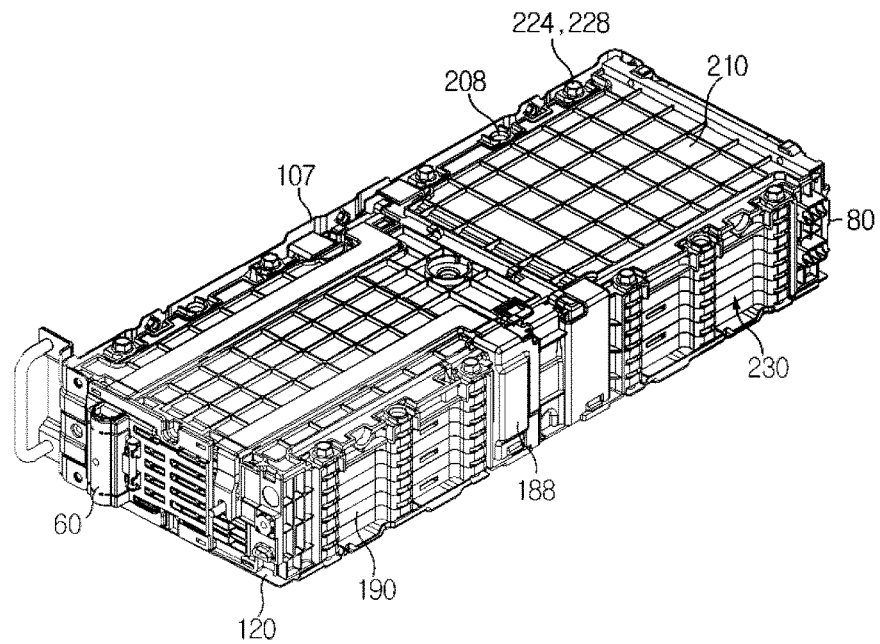

The press members A, B may be coupled with the receivers 205 of the battery cover 210, as illustrated in FIG. 17. The second cover body 188b may include a connection ring (C) on an upper side. The connection ring (C) may be fit into the groove 184f of FIG. 13.

Figure 15:
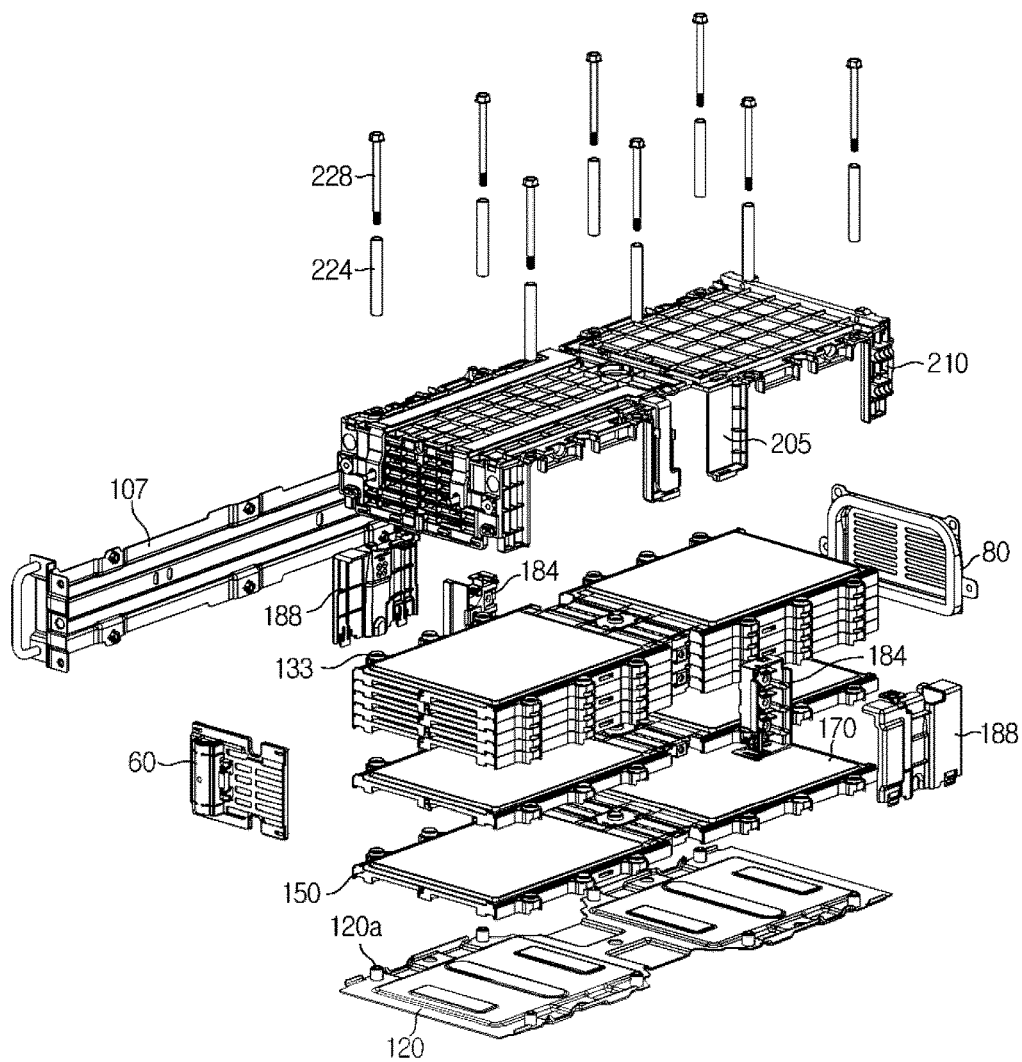
FIGS. 15 to 17 are brief views explaining a method for fabricating the unit cell pack of FIG. 1.
Figure 16:
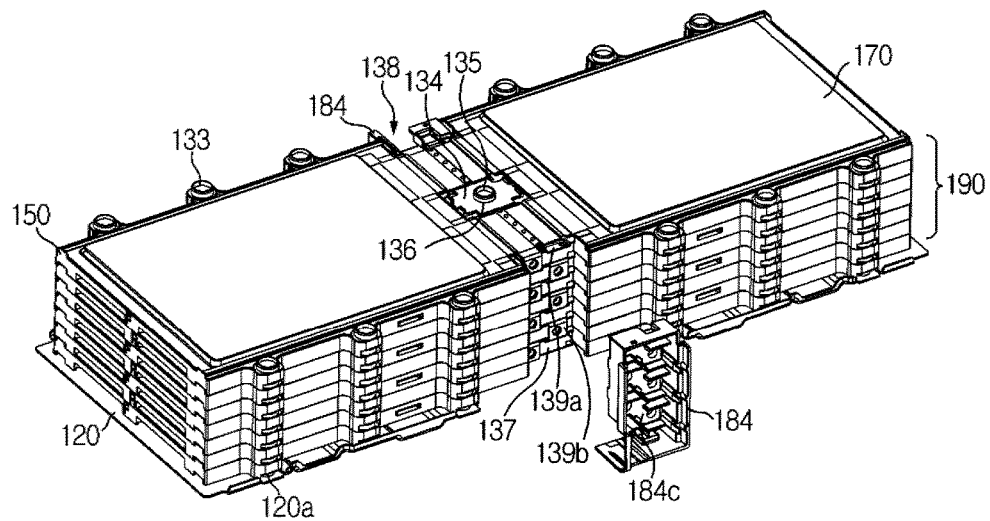

FIGS. 15 to 17 are brief views explaining a method for fabricating the unit cell pack of FIG. 1.

Referring to FIG. 15, the battery housing 110 of FIG. 1, the cartridge fixating plate 120, the battery cartridges 150, a plurality of batteries 170, the electrode connection members 184, the cover members 188, the battery cover 210, a first bushing 224, and a first long bolt 228 may be prepared. The battery housing 110 is partially illustrated in the drawing by using the air inflow window cover 60, the air outflow window cover 80, and the third side plate 107.

The air inflow window cover 60, the air outflow window cover 80, the third side plate 107, the cartridge fixating plate 120, the battery cartridges 150, a plurality of batteries 170, the electrode connection members 184, the cover members 188, and the battery cover 210 are specifically described in FIGS. 1 to 14.

Referring to FIG. 16, the battery cartridges 150 and a plurality of batteries 170 may be alternately stacked on the cartridge fixating plate 120. More specifically, two batteries 170 may be stacked on each of the battery cartridges 150. In the above case, the battery cartridges 150 may be arranged with respect to each other by using the through holes 135 of the cartridge coupling rings 134 and the fitting members 136.

The guide holes 133 of the battery cartridges 150 may be positioned on receiving holes 120a of the cartridge fixating plate 120. While a plurality of batteries 170 are being alternately stacked on the battery cartridges 150, the electrodes of a plurality of batteries 170 may be connected to each other with the laser on the bus bars 137 of the battery cartridges 150, and the electrodes of a plurality of batteries 170 may be thermally bonded onto the bus bars 137 of the battery cartridges 150.

The two batteries 170 on each of the battery cartridges 150 may be electrically connected in parallel. The battery cartridges 150 and a plurality of batteries 170 may form the battery stack 190. Next, the electrode connection members 184 may be inserted into the insertion grooves 138 of the battery cartridges 150. The electrode connection members 184 may be ring-coupled with the coupling grooves 139b of the bus bars 137 of the uppermost battery cartridge 150 of the battery cartridges 150 and also screw-coupled with the coupling members 139a of the battery cartridges 150, to be electrically connected with the electrodes of a plurality of batteries 170.

More specifically, each of the electrode connection members 184 may be ring-coupled with the coupling groove 139b of the bus bar 137 by using the protrusion 184e of the connection body 184a of FIG. 13. Each of the electrode connection members 184 may bring the connection electrodes 184c of the connection body 184a of FIG. 13 to contact with the coupling members 139a of the battery cartridges 150 to be screw-coupled with the coupling members 139*a* by using the connection electrodes 184*c*. As a result, the electrode connection members 184 may be electrically connected in series with the battery cartridges 150.

Referring to FIG. 17, the battery structure 190 and the electrode connection members 184 of FIG. 16 may be covered with the battery cover 210. The battery cover 210 may include the guide holes 208 on the edge.

The guide holes 208 of the battery cover 210 may be positioned on the guide holes 133 of the battery cartridges 150, as illustrated in FIG. 16. Next, the receiving holes 120*a* (see FIG. 16) of the cartridge fixating plate 120, the guide holes 133 of the battery cartridges 150, and the guide holes 208 of the battery cover 210 may be coupled with the first bushings 224 and the first long bolts 228. The first long bolts 228 may be respectively inserted into the first bushings 224. The electrode connection members 184 and the battery cover 210 may be covered with the part covers 188.

The part covers 188 may be seated on the receivers 205 of the battery cover 210, as illustrated in FIG. 15. The part covers 188 may cover the electrode connection members 184 with the cartridge fixating plate 120, the battery stack 190, and the battery cover 210. The cartridge fixating plate 120, the battery stack 190, the battery cover 210, the electrode connection members 184 and the part covers 188 may form the first battery module 230. After the first battery module 230 is formed, the second battery module 240 of FIG. 1 or FIG. 2 may be prepared adjacently to the first battery module 230.

The second battery module 240 may include same constituent elements as the first battery module 230. The battery housing 110 of FIG. 1 or FIG. 2 may be on the first battery module 230 and the second battery module 240, surrounding the same. More specifically, the air inflow window covers 60 and the air outflow window covers 80 of the battery housing 110 may be screw-coupled with side surfaces of the first battery module 230 and the second battery module 240.

The air outflow window covers 80 may include the ethylene propylene diene monomers (EPDM), as illustrated in FIG. 6. The air inflow window covers 60 and the air outflow window covers 80 may be screw-coupled with the lower plate 90, the upper plate 101, the third side plate 103, the fourth side plate 105, and the battery cover 210 of the battery housing 110, while being tightly joined with the battery covers 210 of the first battery module 230 and the second battery module 240.

Further, the first side plate 103 and the second side plate 105 of the battery housing 110 may be fit-coupled with the air inflow window covers 60 and the air outflow window covers 80, between the first battery module 230 and the second battery module 240. The first side plate 103, the second side plate 105, the third side plate 107, and the fourth side plate 109 of the battery housing 110 may be screw-coupled with the lower plate 90 and the upper plate 101.

After the battery housing 110 surrounds the first battery module 230 and the second battery module 240, second bushings (not illustrated) and second long bolts 250 of FIG. 2 may be prepared. The upper plate 101, the cartridge fixating plate 120, the battery cartridges 150, and the battery cover 210 may be provided with the second bushings and the second long bolts 250. More specifically, the second bushings and the second long bolts 250 may penetrate through the upper plate 101, and may be screw-coupled with the guide holes 208 of the battery cover 210, the guide holes 133 of the battery cartridges 150, and the receiving grooves 120*a* of the cartridge fixating plate 120.

The second long bolts 250 may be respectively inserted into the second bushings. The second long bolts 250 may be positioned between the first long bolts 228. Thereafter, the fan duct 30 of FIG. 2 or FIG. 5 may be disposed on the battery housing 110. More specifically, the fan duct 30 may be positioned on the air outflow window covers 80 of the battery housing 110. The blowing fan structure 20 of the fan duct 30 may be positioned between the air outflow window covers 80. That is, the blowing fan structure 20 may be positioned between the first battery module 230 and the second battery module 240 on the battery housing 110.

As a result, the fan duct 30, the first battery module 230, the second battery module 240, and the battery housing 110 may form the unit cell pack 260 of FIG. 1 or FIG. 2.

Figure 18:
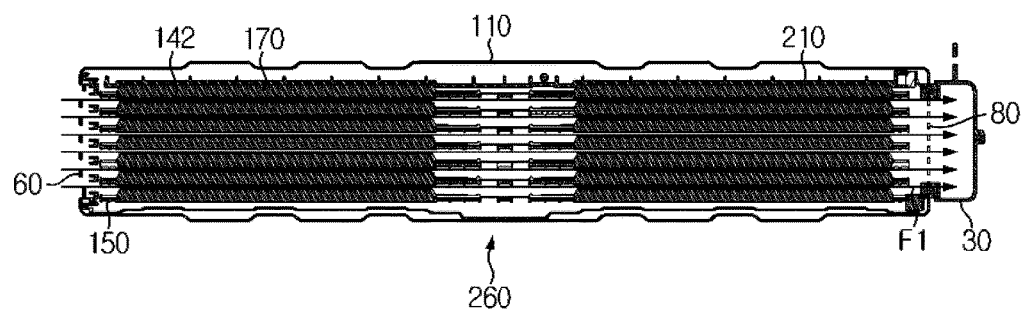
FIGS. 18 to 20 are brief views explaining air flows within the unit cell pack of FIG. 1.
Figure 19:
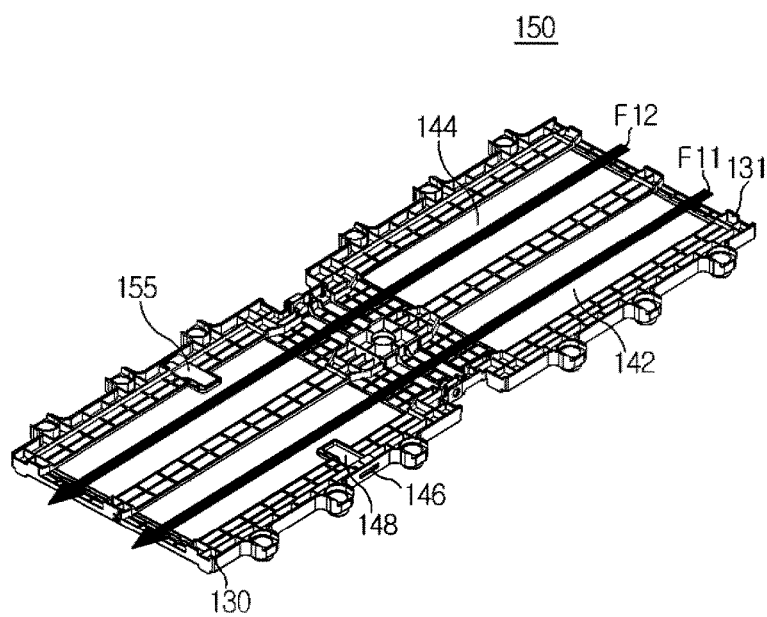
Figure 20:
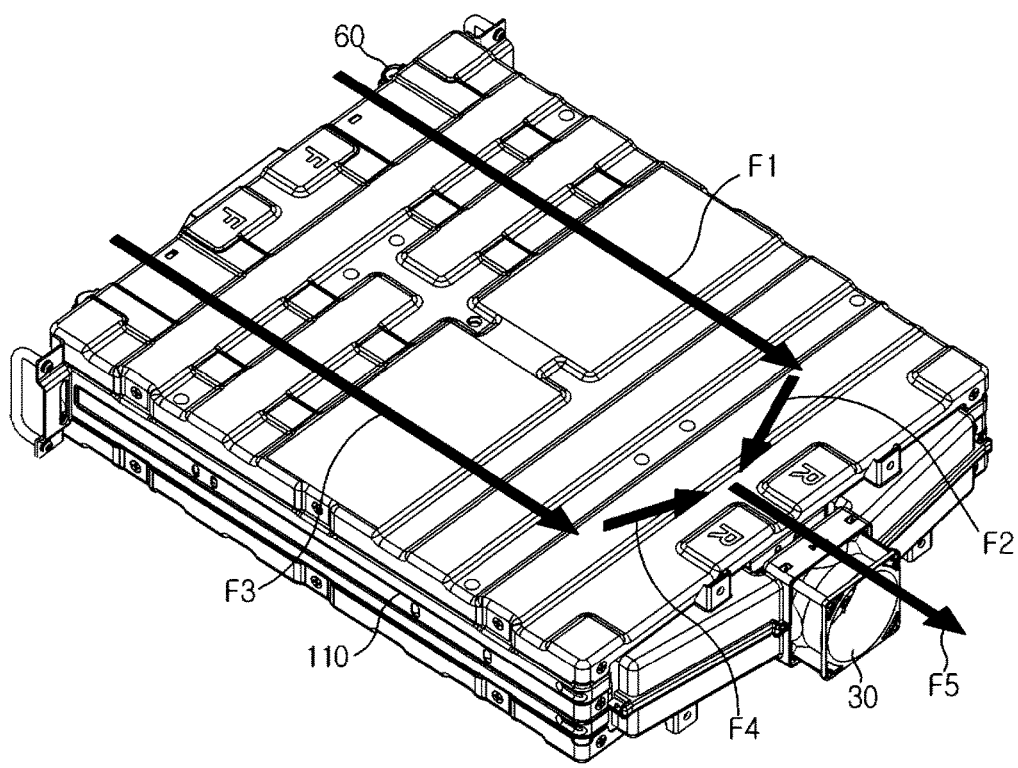

FIGS. 18 to 20 are brief views explaining air flows within the unit cell pack of FIG. 1.

Referring to FIG. 18, the unit cell pack 260 may have a straight line shape of air flows (F1) within the battery housing 110, by using the air inflow window covers 60, the air outflow window covers 80, and the battery cartridges 150 of the battery housing 110. The straight line shape can be obtained because the air flows (F1) may move through the air guide grooves 142 between the battery cartridges 150 and may be quickly discharged from the peripheral region of the battery cartridges 150 to the air outflow window covers 80 by the fan duct 30.

Referring to FIG. 19, each of the air flows (F1) may obtain first air flows (F11) and second air flows (F12) at each of the air guide grooves 142, 144 of the battery cartridges 150. The first air flows (F11) and the second air flows (F12) may contribute to cooling down the two batteries 170 between the two adjacent battery cartridges 150 of the battery cartridges 150 of FIG. 18.

In this case, the battery cartridge 150 positioned in the center among the battery cartridges 150 may include at least one temperature sensor 155 at the temperature sensor seating portions 148. The temperature sensor 155 may measure a temperature of the two batteries 170 positioned on the battery cartridge 150.

Referring to FIG. 20, the fan duct 30 may form the air flows F1, F2 F3, F4 within the battery housing 110. The air flows F1 may pass through the first battery module 230 by way of the air inflow window cover 60 correspondingly to the first battery module 230 of FIG. 1 or FIG. 2. The air flows F3 may pass through the second battery module 240 by way of the air inflow window cover 60 correspondingly to the second battery module 240 of FIG. 1 or FIG. 2.

The air flows F2, F4 may flow through the fan duct 30 by way of the air outflow window covers 80 corresponding to the air inflow window covers 60. Next, the air flows F2, F4 may be formed into air flows F5 on the air blowing board 6 (see FIG. 4 or FIG. 5) of the fan duct 30. Next, the fan duct 30 may extend the air flows F5 externally from the battery housing 110 by using the blowing fan structure 20 of FIG. 5.

In describing a variety of aspects of the present disclosure, the elements named in the specification will have to be understood as the elements that are distinguished functionally, rather than being distinguished physically. Accordingly, the respective elements may be optionally incorporated with another element, or each of the elements may be divided into sub-elements such that the respective elements efficiently implement an embodiment of the present disclosure. However, even when the elements are incorporated or divided, it will be obvious to those skilled in the art that the incorporated or divided elements also fall under the scope of the present disclosure, as long as the sameness of functions is acknowledged.

The present disclosure has been described in detail. However, it should be understood that the detailed description and specific examples, while indicating preferred embodiments of the disclosure, are given by way of illustration only, and various changes and modifications within the scope of the disclosure will become apparent to those skilled in the art from this detailed description.

What is claimed is:

1. A unit cell pack, comprising:
a first battery module comprising battery cartridges that are sequentially stacked, a plurality of batteries wherein two batteries are seated on an upper surface of each of the battery cartridges, electrode connection members respectively positioned on both sides of the battery cartridges, and a battery cover covering the battery cartridges, the plurality of batteries, and the electrode connection members;
a second battery module being adjacent to the first battery module and including same constituent elements as the first battery module;
a battery housing surrounding the first battery module and the second battery module, and including air inflow window covers and air outflow window covers facing each other; and
a fan duct disposed on the air outflow window covers of the battery housing, wherein
the two batteries on the upper surface of each of the battery cartridges are electrically connected in parallel,
the battery cartridges are electrically connected in series through the electrode connection members,
a lower surface of each of the battery cartridges defines air guide grooves with respect to each other,
the air guide grooves are aligned with the air inflow window covers and the air outflow window covers on one of the first battery module and the second battery module, forming straight air passages,
each of the battery cartridges comprises two battery seating portions, bus bars positioned between the battery seating portions, and a cartridge coupling ring positioned between the bus bars to connect the battery seating portions, and
the cartridge coupling ring comprises a through hole passing through a central region, and a fitting member protruding from an inlet of one side portion of the through hole.

2. The unit cell pack of claim 1, wherein the battery cartridges are formed such that, between the two adjacent battery cartridges, a hollow portion is formed through the air guide grooves at a central region, and the battery cartridges contact each other at a peripheral region with edges parallel to the air guide grooves.

3. The unit cell pack of claim 1, wherein each of the battery cartridges is an injection molded part, and
the battery seating portions and the cartridge coupling ring comprise an insulating material.

4. The unit cell pack of claim 3, wherein the battery seating portions and the bus bars respectively define insertion grooves on opposite sides of the cartridge coupling ring between the battery seating portions.

5. The unit cell pack of claim 4, wherein the bus bars, at a peripheral region of the insertion grooves, comprises coupling grooves on one side and fastening members on a side surface vertical to the one surface, and the bus bars and the fastening members comprise a conductive material.

6. The unit cell pack of claim 3, wherein the cartridge coupling ring comprises a through hole passing through a central region, and a fitting member protruding from an inlet of one side portion of the through hole,
wherein the one side portion of the through hole has a diameter smaller than that of the other side portion of the through hole,
an external diameter of the fitting member is smaller than a diameter of the other side portion of the through hole, and
the fitting member and the through hole fit-couple the two adjacent battery cartridges.

7. The unit cell pack of claim 1, wherein each of the battery cartridges comprises:
temperature sensor seating portions being formed across the lower surface and the upper surface, being exposed immediately below one of the two batteries, and respectively protruding from the edges parallel to the air guide grooves toward the air guide grooves; and
temperature sensor entrances respectively exposing internal passages of the temperature sensor seating portions through the side surfaces between the lower surface and the upper surface.

8. The unit cell pack of claim 7, wherein the temperature sensor seating portions comprise at least one temperature sensor in the battery cartridge positioned at a center among the battery cartridges.

9. The unit cell pack of claim 3, wherein, on the upper surface of each of the battery cartridges, the two batteries are connected with each other with electrodes of same polarity with laser, and brought into contact with the bus bars with the electrodes of same polarity by thermal bonding.

10. The unit cell pack of claim 5, wherein the electrode connection members are electrically connected with electrodes of a plurality of batteries by being inserted into insertion grooves of the battery cartridges, ring-coupled with coupling grooves of the bus bars of an uppermost battery cartridge in the battery cartridges, and screw-coupled with the coupling members of the battery cartridges.

11. The unit cell pack of claim 1, wherein the first battery module further comprises:
a cartridge fixating plate positioned below the battery cartridges; and
part covers respectively surrounding the electrode connection members with the cartridge fixating plate, the battery cartridges, a plurality of batteries, and the battery cover.

12. The unit cell pack of claim 11, wherein the battery housing further comprises:
a lower plate;
an upper plate;
a first side plate positioned between the air inflow window covers and a second side plate positioned between the air outflow window covers, the first side plate and the second side plate facing each other between the lower plate and the upper plate and connecting the lower plate and the upper plate; and
a third side plate and a fourth side plate positioned vertically to the first side plate and the second side plate between the lower plate and the upper plate, and facing each other.

13. The unit cell pack of claim 12, wherein the air inflow window covers and the air outflow window covers are screw-coupled with the lower plate, the battery cover, the upper plate, the third side plate and the fourth side plate, while being tightly joined to the battery cover, the air outflow window covers comprise ethylene propylene diene monomers, the first side plate and the second side plate are fit-coupled with the air inflow window covers and the air outflow window covers, and the first side plate, the second side plate, the third side plate, and the fourth side plate are screw-coupled with the lower plate and the upper plate.

14. The unit cell pack of claim 1, wherein the fan duct comprises air suction boards respectively defining air inlets while respectively surrounding the air outflow window covers, an air blowing board defining an air collector while being positioned between the air suction boards, and a blowing fan structure inserted into the air blowing board, wherein each of the air suction boards and the air blowing board is separable through a central region in a direction vertical to a direction in which the first battery module and the second battery module are arranged.

15. The unit cell pack of claim 14, wherein the air suction boards and the air blowing board are connected in fluid communication with each other through the air inlets and the air collector, and the blowing fan structure suctions air from the battery housing through the air inflow window covers, the air outflow window covers, the air inlets, and the air collector, and transmits the air externally from the fan duct.

\* \* \* \* \*